3,542,588
DURABLE, READY TO USE PLATES FOR THIN LAYER CHROMATOGRAPHY AND METHOD FOR THEIR PRODUCTION
Wilhelm Heidbrink, Rotes Schlossle, Germany, assignor to Warner-Lambert Pharmaceutical Company, Morris Plains, N.J., a corporation of Delaware
No Drawing. Filed Dec. 8, 1965, Ser. No. 512,517
Int. Cl. C03c *17/00, 21/00*
U.S. Cl. 117—124                                         3 Claims

ABSTRACT OF THE DISCLOSURE

An improvement is described in the method of applying the absorbent to plates used in thin layer chromatography. The improvement involves applying the absorbent to the plates in the form of an aqueous slurry which contains either one or more chloride, sulfate, phosphate, chlorate, perchlorate or borate salts of an alkali metal or, in lieu thereof, a relatively soluble alkaline earth metal hydroxide which reacts with the carbon dioxide in the air to form the corresponding carbonate.

---

The inclusion of such salt or such base in the slurry greatly improves the adherence of the absorbent layer to the plate without impairing the porosity of the layer or its absorbent activity.

This invention is concerned with durable, ready to use plates for thin layer chromatography which may be shipped or transported without injury and to a method for their production.

Thin layer chromatography has acquired a considerable degree of acceptance as an analytical procedure for the separation of chemical substances as well as for the isolation of chemically pure materials.

The essential or characteristic feature of thin layer chromatography lies in the preparation of an aqueous or other liquid slurry of a finely divided absorbent material, usually inorganic in nature, such as silica gel or aluminum oxide, and the coating of a uniform layer of this slurry on glass plates. The coating can be applied, with the aid of suitable coating devices, by dipping the plates in the slurry or can be effected by spraying or casting the slurry. After evaporation of the liquid a thin layer of the absorbent material remains on the glass plate. This layer can subsequently be activated by heating the plate.

The absorbent clings to the glass surface through adhesion. For this reason the thin layers are very easily damaged and can be removed even with a light touch. Accordingly, the prepared plates must be handled very carefully and cannot be shipped since the thin layer will be destroyed if the plates are strongly jarred or dropped. Accordingly, plates for thin layer chromatography for use in the laboratory must be prepared there.

In the case of many absorbent materials calcined gypsum has been added in order to obtain improved adherence. The gypsum sets several minutes after the plates are coated. Gypsum exhibits only little activity as an absorbent so that the maximum amount which can be added to the slurry is about 10%. In such small amount, the gypsum exhibits only limited binding power in the dried layer. If the coated plates must then be heated to a temperature above 100° C. to be activated the gypsum loses its water of crystallization and becomes inactivated.

Accordingly, the present invention has as its object the elimination of the foregoing disadvantages of thin layer chromatography plates and the provision of durable coated plates which can be shipped ready for use.

It has now been found that the aforementioned disadvantages may be overcome and greatly improved adherence of the thin absorbent layer can be obtained if certain water-soluble inorganic compounds are incorporated in the absorbent layer, for example, if the absorbent material employed is slurried with a solution of the inorganic compound and the thin layer formed by use of this slurry. The water-soluble inorganic compounds employed in accordance with this invention have the ability of cementing the particles together or drying the layer without impairing the porosity of the layer or its absorbent activity.

The number of compounds suitable for use in accordance with this invention is limited. Only those compounds are suitable which are stable to air after drying; which are not hygroscopic and which do not lose their water of crystallization through efflorescence and crumble. In addition, the compounds should be substantially insoluble in organic solvents since it is principally organic solvents which are used in thin layer chromatography for developing the chromatogram. Also, the compounds should be colorless and unchanged on exposure to light.

The durable, ready to use, thin layer chromatography plates of this invention which carry an absorbent layer mounted on a carrier are particularly characterized in that the absorbent layer contains one or more water-soluble inorganic compounds which are colorless, non-hygroscopic, insensitive to light, substantially insoluble in organic solvents and resistant to efflorescence and disintegration.

As examples of the preferred compounds which are useful in the practice of this invention there may be mentioned the chloride, sulfate, phosphate, chlorate, perchlorate or borate salts of the alkali metals as well as mixtures of these salts. The preferred salts also include those relatively soluble inorganic bases such as calcium hydroxide or barium hydroxide which react with the carbon dioxide present in the air and bind the absorbent material together by formation of the corresponding carbonate. The potassium salts are especially preferred particularly salts such as potassium sulfate, potassium bisulfate and potassium phosphate.

On drying these salts form crystals which bind the absorbent particles to each other without, surprisingly, impairing the porosity of the layer or the activity of the absorbent.

Absorbents useful in the practice of this invention are the commonly employed inorganic absorbents especially aluminum oxide and diatomaceous earth as well as silica gel.

The superior characteristics of thin layer chromatography particularly as compared to paper partition chromatography are entirely retained. The ability to develop the chromatogram in corrosive reagents and by use of high temperatures is fully retained in the thin layer chromatography plates of the present invention.

These plates are prepared by mixing the absorbent with an aqueous solution of the particular inorganic compound employed and then using the slurry obtained to apply a desired thin layer of material on to the glass plate. The concentration of the inorganic compound or compounds in the aqueous slurry depends upon the inorganic compound used and in certain instances also depends upon the intended use. Generally, the inorganic compound can be employed in aqueous solution in concentrations of 2.5 to 20% by weight and particularly in concentrations of 5 to 10%. When basic compounds are employed, particularly those which absorb carbon dioxide to form carbonates, they are employed generally in somewhat lower concentrations than neutral or acid compounds.

If one employes a neutral solution of the added inorganic compound or a neutral mixture of said compounds or an inorganic base such as calcium or barium hydroxide which is neutralized by the absorption of carbon dioxide from the air, the ability of the usual absorbent materials in the thin layer to effect the separation of separable materials remains unchanged.

In accordance with the present invention it is quite possible by the addition of acid or alkaline alkali metal salts of polybasic inorganic acids to affect the ability of the thin layer to separate acid or alkaline compounds continuously and within wide limits as required.

The ready to use thin layer plates are sufficiently durable and stable to be shipped without danger of being damaged. Now for the first time the expert has available mechanically prepared coated plates for thin layer chromatography where he is freed from the bother of having to coat these thin layer plates, a procedure requiring great experience and skill. In addition, the mechanically mass-produced thin layer plates are uniform and exhibit a more accurately defined ability to effect separations than plates which are hand coated.

In the quantitative evaluation of the thin layer chromatograms the coated plates of this invention have the added advantage that damage to the layer by application of the substance being tested by means of the usual application pipette is substantially eliminated. The precision with which the quantitative analysis of the thin layer chromatograms may be effected is accordingly substantially increased.

The following examples illustrate the preferred forms of carrying out this invention:

EXAMPLE 1

Silica gel is mixed with a 5–10% aqueous solution of potassium sulfate to form a slurry and glass plates are coated with a layer of this slurry in any customary way. After drying, the plates thus obtained are distinguished by the excellent adhesion and strength of the absorbent layer which they exhibit.

EXAMPLE 2

Silica gel is mixed with an aqueous solution of potassium sulfate and potassium bisulfate having a pH below 7 in an amount sufficient to form a slurry which is then layered on glass plates and dried. The coated plates have all of the several advantages indicated.

EXAMPLE 3

Silica gel is mixed with an aqueous solution of potassium sulfate and dibasic potassium phosphate at a pH above 7 in the manner described in Example 1 and the slurry obtained layered on glass plates and dried.

EXAMPLE 4

Silica gel is mixed to form a slurry with a 5% aqueous solution of sodium chloride and glass plates are coated with this slurry in the customary way.

EXAMPLE 5

Silica gel is mixed to a slurry with a saturated aqueous solution of barium hydroxide (approximately a 3.5% solution) and the slurry then coated in the usual way on to glass plates. After drying the plates are exposed to air for a sufficient period to enable the barium hydroxide to be completely neutralized by taking up carbon dioxide from the air.

In the foregoing examples the amount of silica gel absorbent mixed with the aqueous solution will vary depending upon the viscosity desired in the final slurry which depends in turn upon the method of coating and on the rate of speed employed in spreading the coating. Generally, about one part by weight of absorbent in two parts by weight of solution is satisfactory.

It is understood that the foregoing detailed description is given merely by way of illustration and that many variations may be made therein without departing from the spirit of my invention.

Having described my invention, what I desire to secure by Letters Patent is:

1. In the process for the production of durable thin layer chromatography plates which are ready for use which comprises applying to a glass thin layer chromatography plate an aqueous slurry containing an inorganic absorbent material and drying such plates to deposit thereon a thin layer of said absorbent material, the improvement which comprises including in the absorbent-containing aqueous slurry a water soluble potassium salt selected from the group consisting of chloride, sulfate, phosphate, chlorate, perchlorate, borate and a mixture of two or more such salts, said slurry having been prepared by mixing the absorbent material with a 2.5% to 20% by weight aqueous solution of the water-souble potassium salt, said potassium salt serving to improve the adherence of the thin absorbent layer to the said plate without impairing the porosity of the layer or its absorbent activity.

2. The thin layer chromatography plates obtained in accordance with claim 1.

3. Thin layer chromatography plates which are ready for use said plates having been produced by an improvement in the process comprising applying to a glass thin layer chromatography plate an aqueous slurry containing an inorganic absorbent material and drying said plate to deposit thereon a thin layer of said absorbent material, the improvement in said process comprising including in the absorbent-containing aqueous slurry, a water-soluble inorganic compound selected from the group consisting of an alkali metal chloride, alkali metal sulfate, alkali metal phosphate, alkali metal chlorate, alkali metal perchlorate, alkali metal borate, a mixture of two or more such alkali metal salts and an alkaline earth metal hydroxide capable of reacting with the carbon dioxide present in the air to form the corresponding alkaline earth metal carbonate, said slurry having been prepared by mixing the absorbent material with a 2.5% to 20 % by weight of aqueous solution of the water-soluble inorganic compound, said water-soluble inorganic compound serving to improve the adherence of the thin absorbent layer to the said plate without impairing the porosity of the layer or its absorbent activity.

References Cited

UNITED STATES PATENTS

| 2,877,139 | 3/1959 | Hyde. |
| 2,978,349 | 4/1961 | Walsh et al. _____ 117—169 XR |
| 3,142,583 | 7/1964 | McMahon et al. __ 117—169 XR |
| 3,303,043 | 2/1967 | Halpaap et al. |

FOREIGN PATENTS

| 119,268 | 5/1945 | Australia. |

DAVID KLEIN, Primary Examiner

U.S. Cl. X.R.

210—198